US006984424B2

(12) United States Patent
Suzuki et al.

(10) Patent No.: US 6,984,424 B2
(45) Date of Patent: Jan. 10, 2006

(54) THERMALLY TRANSFERABLE IMAGE PROTECTIVE SHEET, METHOD FOR PROTECTIVE LAYER FORMATION, AND RECORD PRODUCED BY SAID METHOD

(75) Inventors: Taro Suzuki, Shinjuku-ku (JP); Daisuke Fukui, Shinjuku-ku (JP); Masahiro Fujita, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/375,149

(22) Filed: Feb. 28, 2003

(65) Prior Publication Data

US 2003/0165753 A1 Sep. 4, 2003

(30) Foreign Application Priority Data

Mar. 1, 2002 (JP) ............................ 2002-055197

(51) Int. Cl.
*G03C 11/08* (2006.01)
*B44C 1/165* (2006.01)
*B41M 3/12* (2006.01)
*B32B 19/00* (2006.01)

(52) U.S. Cl. ................ 428/32.63; 156/230; 428/32.81; 428/32.87; 428/220; 428/337; 428/914; 430/200; 430/259; 430/403; 430/961

(58) Field of Classification Search ................ 430/259, 430/200, 403, 961; 428/337, 220, 914, 32.63, 428/32.81, 32.87; 156/230
See application file for complete search history.

(56) References Cited

U.S. PATENT DOCUMENTS 4,522,881 A * 6/1985 Kobayashi et al. ......... 428/336
6,027,850 A * 2/2000 Kawakami et al. ......... 430/200
6,114,027 A * 9/2000 Onishi et al. ............... 428/323
6,172,002 B1 * 1/2001 Saito et al. ................. 428/914
6,180,209 B1 * 1/2001 Sato et al. .................. 428/141
6,190,826 B1 * 2/2001 Chang et al. ............... 430/200
6,733,611 B2 * 5/2004 Hayashi et al.

(Continued)

FOREIGN PATENT DOCUMENTS

EP 0 664 485 A2 7/1995

(Continued)

*Primary Examiner*—Richard L. Schilling
(74) *Attorney, Agent, or Firm*—Oliff & Berridge, PLC

(57) ABSTRACT

Disclosed are a thermally transferable image protective sheet and a method for protective layer formation that can provide a protective layer which can protect an image of a record produced by a nonsilver photographic color hard copy recording method, can impart lightfastness and other properties to the record, and can realize a record having a glossy impression comparable to silver salt photographs. The thermally transferable image protective sheet comprises a support and a thermally transferable resin layer having a single-layer or multilayer structure stacked on the support so as to be separable from the support. The thermally transferable image protective sheet has been constructed so that, when the thermally transferable image protective sheet is put on top of a print so as for the thermally transferable resin layer to be brought into contact with an image portion in the print and the thermally transferable resin layer is thermally transferred to cover at least the image portion of the print followed by the separation of the support from the thermally transferable image protective sheet to form a thermally transferred resin layer on the surface of the print, the surface of the thermally transferred resin layer on the print has a specular glossiness of not less than 60% as measured at an angle of incidence of 20 degrees according to JIS (Japanese Industrial Standards) Z 8741.

3 Claims, 1 Drawing Sheet

U.S. PATENT DOCUMENTS

| | | | | |
|---|---|---|---|---|
| 6,802,925 | B2 * | 10/2004 | Kobayashi et al. | 156/234 |
| 2001/0046592 | A1 | 11/2001 | Oshima et al. | 428/195 |
| 2004/0029030 | A1 * | 2/2004 | Murray | |

FOREIGN PATENT DOCUMENTS

| | | |
|---|---|---|
| EP | 0 684 455 A2 | 7/1995 |
| JP | 6-234277 | 8/1994 |
| JP | 09 254561 | 9/1997 |
| JP | 09 254581 | 9/1997 |
| JP | 10-297125 | 11/1998 |
| JP | 11-180056 | 7/1999 |
| JP | 2001-287390 | 10/2001 |
| WO | WO 01/12342 A1 | 2/2001 |

* cited by examiner

THERMALLY TRANSFERABLE IMAGE PROTECTIVE SHEET, METHOD FOR PROTECTIVE LAYER FORMATION, AND RECORD PRODUCED BY SAID METHOD

BACKGROUND OF THE INVENTION

1. Field of the Invention

The present invention relates to a thermally transferable image protective sheet that can provide a protective layer which can protect an image in a record produced by a nonsilver photographic color hard copy recording method such as an electrophotographic recording method, an ink jet recording method, or a thermal transfer recording method, can improve lightfastness and other properties to the record, and can realize a record having texture comparable to silver salt photographs by virtue of a good glossy impression of the image surface. The present invention also relates to a method for protective layer formation using the thermally transferable image protective sheet and a record produced by the method.

2. Prior Art

By virtue of the advance of digital cameras and color hard copy technology in recent years, prints having full-color images formed thereon by a nonsilver photographic method, such as an electrophotographic recording method, an ink jet recording method, or a thermal transfer recording method, could have become immediately prepared in situ as the need arises, without the need for a person to ask a processing laboratory for development and to receive prints later from the processing laboratory.

Full-color prints formed by this method, however, are disadvantageous in that images blur upon contact with water, chemicals or the like and, further, upon rubbing against hard objects, images are separated or smeared.

For example, in the electrophotographic recording method, a toner image is transferred onto an image receiving object, the toner is melted by a hot roll, and the melted toner is self-cooled to adhere and fix the toner onto the image receiving object. The records thus obtained, however, are unsatisfactory in lightfastness of images yielded by yellow toner.

Further, records produced by the ink jet recording method suffer from a problem of low lightfastness and low ozone-fastness of ink jet recording inks.

To overcome the above problems, Japanese Patent Laid-Open No. 224779/1983 proposes a recording apparatus wherein a laminate material with a hot-melt adhesive is heated together with a recorded material to apply the laminate material to the recorded material.

Further, Japanese Patent Laid-Open No. 315641/1998 proposes a method wherein, in order to protect an image in a print produced by a transfer recording method such as a thermal dye sublimation transfer method or an ink jet recording method, a protective layer is thermally transferred, onto the print, using a protective layer transfer sheet comprising a substrate and a protective layer provided separably on the substrate.

The above method wherein a protective layer is thermally transferred from the protective layer transfer sheet onto an image face of a record, can provide a record with a protective layer formed thereon which has a certain level of glossy impression. The glossiness, however, is inferior to the target glossiness, that is, the glossiness of silver salt photographs, and, when the image of the record with the protective layer thermally transferred thereon is observed, the impression is that the texture and the appearance are inferior to those of silver salt photographs.

In view of the above problems of the prior art, the present invention has been made, and it is an object of the present invention to provide a thermally transferable image protective sheet and a method for protective layer formation that can provide a protective layer which can protect an image of a record produced by a nonsilver photographic color hard copy recording method, can impart lightfastness and other properties to the record, and can realize a record having a glossy impression comparable to silver salt photographs.

SUMMARY OF THE INVENTION

According to one aspect of the present invention, there is provided a thermally transferable image protective sheet comprising: a support; and a thermally transferable resin layer having a single-layer or multilayer structure stacked on the support so as to be separable from the support, the thermally transferable image protective sheet having been constructed so that, when the thermally transferable image protective sheet is put on top of a print so as for the thermally transferable resin layer to be brought into contact with an image portion in the print and the thermally transferable resin layer is thermally transferred to cover at least the image portion of the print followed by the separation of the support from the thermally transferable image protective sheet to form a thermally transferred resin layer on the surface of the print, the surface of the thermally transferred resin layer on the print has a specular glossiness of not less than 60% as measured at an angle of incidence of 20 degrees according to JIS (Japanese Industrial Standards) Z 8741.

According to another aspect of the present invention, there is provided a thermally transferable image protective sheet comprising: a support; and a thermally transferable resin layer having a single-layer or multilayer structure stacked on the support so as to be separable from the support, the thermally transferable image protective sheet having been constructed so that, when the thermally transferable image protective sheet is put on top of a print so as for the thermally transferable resin layer to be brought into contact with an image portion in the print and the thermally transferable resin layer is thermally transferred to cover at least the image portion of the print followed by the separation of the support from the thermally transferable image protective sheet to form a thermally transferred resin layer on the surface of the print, the surface roughness Ra of the thermally transferred resin layer on the print is not more than 18 nm.

In the above thermally transferable image protective sheets, preferably, the support has a multilayer structure of two or more layers, and the layer, which constitutes the support and is located on the thermally transferable resin layer side, has a surface roughness Ra of not more than 18 nm while the layer, which constitutes the support and is located on a opposite side of the thermally transferable resin layer side, has a surface roughness Ra larger than that of the layer provided on the thermally transferable resin layer side.

In the above thermally transferable image protective sheets, preferably, the image in the print has been formed by a method selected from the group consisting of an electrophotographic recording method, an ink jet recording method, and a thermal transfer recording method.

According to a further aspect of the present invention, there is provided a method for protective layer formation using the above thermally transferable image protective sheet, said method comprising the steps of: putting the thermally transferable image protective sheet and a print on top of each other so that the thermally transferable resin layer is brought into contact with the image face of the print; thermally transferring the thermally transferable resin layer onto the print to form a thermally transferred resin layer on the surface of the print so that at least the printed portion in the print is covered with the thermally transferred resin layer; and separating the support from the thermally transferable image protective sheet after the thermal transfer to form a protective layer formed of the thermally transferred resin layer on the image in the print.

The above method can provide a record comprising a print having an image and a protective layer formed of a thermally transferred resin layer provided on the image. The formed print (record) covered with the thermally transferred resin layer has a protected image, possesses excellent fastness or resistance properties such as excellent lightfastness, and gives a good glossy impression comparable to silver salt photographs when the image is observed.

DETAILED DESCRIPTION OF THE INVENTION

The thermally transferable image protective sheet, the method for protective layer formation, and the record produced by the method according to the present invention will be explained with reference to the accompanying drawings.

Figure 1:
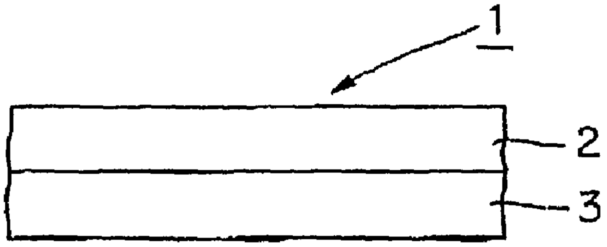
FIG. 1 is a schematic cross-sectional view showing one embodiment of the thermally transferable image protective sheet according to the present invention.

FIG. 1 is a schematic cross-sectional view showing one embodiment of the thermally transferable, image protective sheet 1 according to the present invention. In the thermally transferable image protective sheet 1, a thermally transferable resin layer 3 is provided directly on a support 2. Upon heating, the thermally transferable resin layer 3 can be separated from the support 2. In this case, the thermally transferable resin layer 3 has a single-layer structure.

Figure 2:
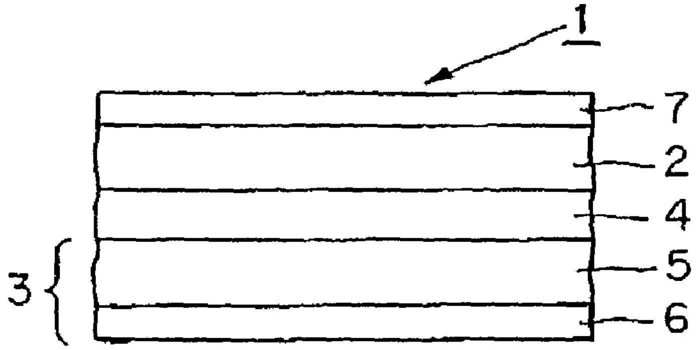
FIG. 2 is a schematic cross-sectional view showing another embodiment of the thermally transferable image protective sheet according to the present invention.

FIG. 2 is a schematic cross-sectional view showing another embodiment of the thermally transferable image protective sheet 1 according to the present invention. In the thermally transferable image protective sheet 1, a release layer 4, a protective layer 5, and an adhesive layer 6 are provided in that order on a support 2. In this case, upon heating of the thermally transferable image protective sheet 1, two layers of the protective layer 5 and the adhesive layer 6 are separated from the support 2. As shown in the drawing, in this embodiment, the thermally transferable resin layer 3 has a two-layer structure. Thus, in this embodiment, by virtue of the provision of the release layer 4, upon heating of the thermally transferable image protective sheet 1, the thermally transferable resin layer 3 can be easily separated from the support 2. Further, the thermally transferable resin layer 3 has the adhesive layer 6 which constitutes the outermost surface of the thermally transferable image protective sheet 1. The provision of this adhesive layer 6 can enhance the transferability of the thermally transferable resin layer 3 onto a print and the adhesion between the thermally transferable resin layer 3 and the print. A heat-resistant slip layer 7 is provided on the other side of the support 2. The heat-resistant slip layer 7 can avoid adverse effects, for example, sticking of the thermally transferable image protective sheet to heating means, such as a thermal head, or cockling of the thermally transferable image protective sheet.

Figure 3:
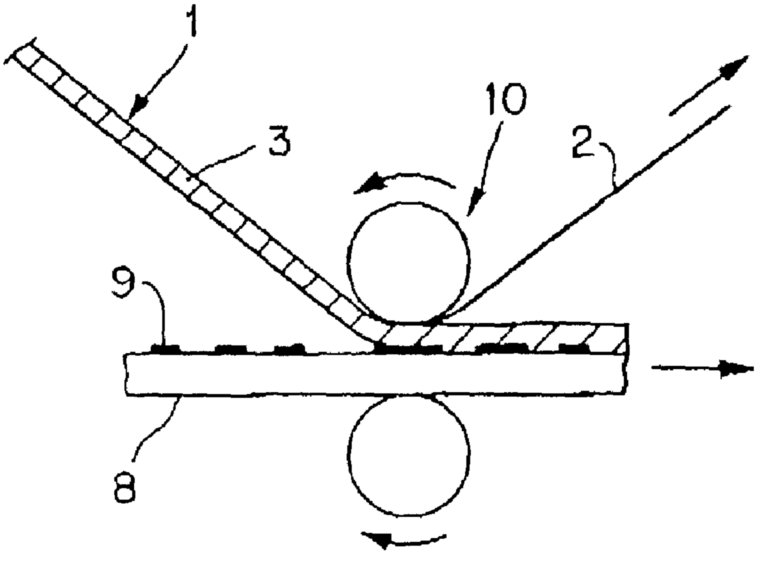
FIG. 3 is an explanatory view showing one embodiment of the method for protective layer formation according to the present invention.

FIG. 3 is a typical diagram illustrating one embodiment of the method for protective layer formation according to the present invention. In this embodiment, a print 8 and a thermally transferable image protective sheet 1 according to the present invention are first provided. The print 8 has an image 9 formed by any one of an electrophotographic recording method, an ink jet recording method, and a thermal transfer recording method. The print 8 and the thermally transferable image protective sheet 1 are put on top of each other so that the image 9 in the print a is brought into contact with the thermally transferable resin layer 3 in the thermally transferable image protective sheet 1. The thermally transferable resin layer 3 is thermally transferred onto the image 9 in the print 8 by a heat roll as thermal transfer means 10. Thereafter, the support 2 is separated and removed to form a protective layer on the surface of the print.

The thermally transferable image protective sheet and the layers constituting the thermally transferable image protective sheet according to the present invention will be described in more detail.

Thermally Transferable Image Protective Sheet

The thermally transferable image protective sheet 1 according to the present invention comprises a support and a thermally transferable resin layer having a single-layer or multilayer structure stacked on one side of the support. In the thermally transferable image protective sheet, a thermally transferable resin layer having a single-layer structure may be provided on the support. Alternatively, a thermally transferable resin layer having a two-layer or multilayer structure, for example, a two-layer or three-layer structure of protective layer/adhesive layer, protective layer/adhesive layer/antistatic layer or the like, may be provided on the support.

Support

In the thermally transferable image protective sheet according to the present invention, any conventional support may be used as the support 2 so far as the support has a certain level of heat resistance and a certain level of strength and the surface roughness Ra of the support on its separable side, that is, on its thermally transferable resin layer side, is not more than 18 nm. Examples of the support usable herein include plastics, for example, polyesters, such as polyethylene terephthalate and polyethylene naphthalate, polypropylene, cellophane, polycarbonate, cellulose acetate, polyethylene, polyvinyl chloride, polystyrene, nylon, polyimide, polyvinylidene chloride, and ionomers. Particularly preferred are films of polyesters such as polyethylene terephthalate and polyethylene naphthalate. The surface roughness Ra of the support on its separable side, that is, on its thermally transferable resin layer side, can be regulated to not more than 18 nm by forming the support by a film formation method wherein a raw material prepared by mixing and kneading the plastic with an inorganic filler, such as calcium carbonate, titanium oxide, barium sulfate, or silicon oxide, or an organic filler, such as an acrylic acid compound or styrene, in regulated particle diameter and addition amount, is subjected to melt extrusion and stretching. In this case, a film formation method for a base film for a magnetic medium or the like described, for example, in Japanese Patent Laid-Open No. 109576/2000, may be utilized to form biaxially oriented laminated polyester films for use as supports in the thermally transferable image protective sheets described herein.

The provision of a resin layer for enhancing the releasability (release layer 4) on the support is preferred, because this can further reduce the surface roughness and, at the same time, the overlying thermally transferable resin layer can be further easily separated.

Preferably, the support has a multilayer structure of two or more layers, and the layer, which constitutes the support and is located on the thermally transferable resin layer side, has a surface roughness Ra of not more than 18 nm while the layer, which constitutes the support and is located on a opposite side of the thermally transferable resin layer side, has a surface roughness Ra larger than that of the layer provided on the thermally transferable resin layer side. When the support having a surface roughness Ra of not more than 18 nm has a single-layer structure, the smoothness of the surface of the support remote from the separable surface, that is, remote from the thermally transferable resin layer is also high. When the smoothness of this surface is excessively high, however, winding properties or anti-blocking properties of the thermally transferable image protective sheet, for example, at the time of the production of the thermally transferable image protective sheet are deteriorated. In the present invention, when a multilayer structure of two or more layers is adopted in the support, the smoothness of only the separable surface of the support, that is, the smoothness of the support on its thermally transferable resin layer, can be enhanced while the other surface of the support has a certain level of roughness. That is, when the support has a two-layer structure of a smooth surface layer having a surface roughness Ra of not more than 18 nm and a rough surface layer, the smoothness of the separation-side surface (smooth surface side) can be enhanced without taking into consideration problems of sheet winding properties and anti-blocking properties. According to this construction, a print can be provided which is superior in glossiness to a print formed by using a protective sheet comprising a support having a single-layer structure.

The thermally transferable image protective sheet according to the present invention comprises a support and a thermally transferable resin layer having a single-layer or multilayer structure stacked separably on the support. In this case, the surface roughness Ra of the support on its separable surface, that is, on its thermally transferable resin layer side, is not more than 18 nm. That is, when a thermally transferable resin layer has been provided directly on the support, the roughness Ra of the support on its surface, where the thermally transferable resin layer has been provide, is not more than 18 nm. When the thermally transferable resin layer has been formed on the support through a nontransferable release layer, upon the thermal transfer of the thermally transferable resin layer, the release layer remains untransferred on the support side. That is, only the thermally transferable resin layer is transferred onto an object, and the surface roughness Ra of the release layer on the support is not more than 18 nm. In the present invention, the roughness Ra of the separable surface on the thermally transferable resin layer side has been specified by measuring the surface roughness Ra of the support side to be separate. In this connection, it should be noted that the surface roughness Ra of the separable surface on the thermally transferable resin layer side correlates with and may be regarded as being substantially identical to the surface roughness Ra of the thermally transferable resin layer which has been separated from the support side upon the thermal transfer.

The surface roughness Ra of the support is preferably not more than 18 nm. In the case of a support having a single-layer structure, a surface roughness Ra of 15 to 5 nm is most preferred from the practical point of view. In this case, a print with a protective layer transferred thereon can be provided which, when the image is viewed, has a good glossy impression comparable to silver salt photographs. When the surface roughness exceeds 18 nm, the glossy impression is deteriorated. On the other hand, when the surface roughness is less than 5 nm, a problem of deteriorated winding properties or blocking occurs. Further, the production of a support roll is difficult, resulting in increased cost, on the other hand, when the support has a multilayer structure of two or more layers, the surface roughness Ra on the separation side may be less than 5 nm. In the case of the support having a multilayer structure, the surface roughness Ra of the support on its surface remote from the separation-side surface is preferably larger than the surface roughness Ra of the layer located or the separation surface side.

The thickness of the support may be properly varied depending upon the material so that the support has proper strength, heat resistance and other properties. The thickness of the support is preferably about 3 to 100 μm. When the thickness of the support is less than 3 μm, the level of the protrusion of fillers from the surface of the film is significant and, consequently, the glossiness is deteriorated. On the other hand, when the thickness exceeds 100 μm, heat necessary for the transfer of the thermally transferable resin layer is less likely to be conducted to the uppermost surface of the thermally transferable resin layer. This makes it difficult to transfer the thermally transferable resin layer onto the print.

Heat-Resistant Slip Layer

In the thermally transferable image protective sheet according to the present invention, a heat-resistant slip layer 7 may be optionally provided on the support in its side remote from the thermally transferable resin layer from the viewpoint of avoiding adverse effects, such as sticking or cockling caused by heat from the thermal head, the heat roll or the like as heat transfer means 10.

Any conventional resin may be used as the resin for the formation of the heat-resistant slip layer 7, and examples thereof include polyvinylbutyral resins, polyvinylacetoacetal resins, polyester resins, vinyl chloride-vinyl acetate copolymer resins, polyether resins, polybutadiene resins, styrene-butadiene copolymer resins, acrylic polyols, polyurethane acrylates, polyester acrylates, polyether acrylates, epoxy acrylates, urethane or epoxy prepolymers, nitrocellulose resins, cellulose nitrate resins, cellulose acetopropionate resins, cellulose acetate butyrate resins, cellulose acetate hydrogenphthalate resins, cellulose acetate resins, aromatic polyamide resins, polyimide resins, polycarbonate resins, and chlorinated polyolefin resins.

Slip property-imparting agents added to or coated onto the heat-resistant slip layer formed of the above resin include phosphoric esters, silicone oils, graphite powders, silicone graft polymers, fluoro graft polymers, acrylic silicone graft polymers, acrylsiloxanes, arylsiloxanes, and other silicone polymers. Preferably, the heat-resistant slip layer is formed of a mixture of a polyol, for example, a polyalcohol polymer compound, a polyisocyanate compound, a phosphoric ester compound, and a filler.

The heat-resistant slip layer may be formed by dissolving or dispersing the above resin, slip property-imparting agent, and filler in a suitable solvent to prepare an ink for a heat-resistant slip layer, coating the ink on the backside of the support, for example, by gravure printing, screen printing, reverse coating using a gravure plate or other formation means, and drying the coating.

Release Layer

The thermally transferable image protective sheet according to the present invention comprises a support and a thermally transferable resin layer having a single-layer or multilayer structure provided separably on the support. As shown in FIG. 2, a release layer 4 may be provided between the support 2 and the thermally transferable resin layer 3. The provision of the release layer can facilitate the separation of the thermally transferable resin layer from the support.

The release layer is not separated from the support upon heating and remained untransferred onto the print as the object. Therefore, in this case, the release layer on its surface in contact with the thermally transferable resin layer is the separable surface (release surface) and serves as the surface of the protective layer of the print. That is, the surface roughness Ra of the separable surface should be brought to not more than 16 nm.

Resins usable for constituting the release layer include, for example, various waxes, such as silicone wax, silicone resins, fluororesins, acrylic resins, polyurethane resins, polyvinyl pyrrolidone resins, polyvinyl alcohol resins, and polyvinyl acetal resins. Microparticles or the like may be added, for example, from the viewpoint of improving the film strength. Among the above resins, homopolymers of monomers, such as acrylic acid or methacrylic acid, or copolymers of acrylic acid or methacrylic acid with other monomer(s) or the like are preferred as the acrylic resin. The acrylic resin has excellent adhesion to the support and separability from a protective layer which is described later.

The release layer is nontransferable and, upon the transfer of the thermally transferable resin layer, remains untransferred on the support side. Therefore, in this case, separation occurs at the interface of the release layer and the protective layer. That in the protective layer separated from the support, side (release layer) is the surface of the protective layer of the object (print) after the thermal transfer. Therefore, for example, excellent surface glossiness of the print and the stable transferability of the protective layer can be realized. For this reason, the provision of the release layer is preferred.

The release layer may be formed by coating a coating liquid for a release layer by a conventional method, such as gravure direct coating, gravure reverse coating, knife coating, air coating, or roll coating, to a thickness of about 0.05 to 5 $g/m^2$, more preferably about 0.5 to 3 $g/m^2$, on a dry basis. When the thickness of the coating on a dry basis is less than 0.05 $g/m^2$, neither good separation effect nor smoothness improvement effect can be attained. On the other hand, when the thickness of the coating on a dry basis exceeds 5 $g/m^2$, the sensitivity in transfer at the time of printing is disadvantageously lowered.

Protective Layer

The protective layer 5 constituting the thermally transferable resin layer having a single-layer or multilayer structure provided on the support in the thermally transferable image protective sheet used in the present invention may be formed of various conventional resins known as resins for a protective layer. Examples of resins for a protective layer usable herein include thermoplastic resins, for example, polyester resins, polystyrene resins, acrylic resins, polyurethane resins, acrylated urethane resins, epoxy resins, phenoxy resins, silicone-modified products of these resins, mixtures of these resins, ionizing radiation-curable resins, and ultraviolet screening resins. In addition, if necessary, ultraviolet absorbers, organic fillers and/or inorganic fillers may be properly added.

A protective layer containing an ionizing radiation-cured resin is particularly excellent in plasticizer resistance and scratch resistance. The ionizing radiation-curable resin usable for this purpose may be any conventional one. For example, a resin-formed by crosslinking and curing a radically polymerizable polymer or oligomer through ionizing radiation irradiation and, if necessary, adding a photopolymerization initiator thereto, and then performing polymerization crosslinking by applying an electron beam or ultraviolet light may be used. The ionizing radiation-cured resin may also be added to the peel layer and the adhesive layer in the thermally transferable image protective sheet.

A protective layer containing an ultraviolet screening resin or an ultraviolet absorber mainly functions to impart lightfastness to prints. An example of the ultraviolet screening resin is a resin formed by reacting a reactive ultraviolet absorber with a thermoplastic resin or the above-described ionizing radiation-curable resin, or by bonding a reactive ultraviolet absorber to a thermoplastic resin or the above-described ionizing radiation-curable resin. More specifically, the ultraviolet screening resin may be, for example, a resin produced by introducing a reactive group, such as an addition-polymerizable double bond (for example, a vinyl, acryloyl, or methacryloyl group) or an alcoholic hydroxyl, amino, carboxyl, epoxy, or isocyanate group into a conventional nonreactive organic ultraviolet absorber, for example, a salicylate, phenyl acrylate, benzophenone, benzotriazole, cumarin, triazine, or nickel chelate nonreactive organic ultraviolet absorber.

The ultraviolet absorber may be a conventional nonreactive organic ultraviolet absorber, and examples thereof include salicylate, phenyl acrylate, benzophenone, benzotriazole, cumarin, triazine, and nickel chelate nonreactive organic ultraviolet absorbers. The ultraviolet screening resin and the ultraviolet absorber may also be added to the peel layer and the adhesive layer in the thermally transferable image protective sheet.

The amount of the ultraviolet screening resin and the ultraviolet absorber added is 1 to 30% by weight, preferably about 5 to 20% by weight, based on the binder resin.

Specific examples of organic fillers and/or inorganic fillers usable herein include, but are not particularly limited to, polyethylene wax, bisamide, nylon, acrylic resin, crosslinked polystyrene, silicone resin, silicone rubber, talc, calcium carbonate, titanium oxide, and finely divided silica such as microsilica and colloidal silica. Preferably, the filler has good slipperiness and has a particle diameter of not more than 10 $\mu$m, more preferably in the range of 0.1 to 3 $\mu$m. Preferably, the amount of the filler added is in the range of 0 to 100 parts by weight based on 100 parts by weight of the above resin component and, at the same time, is such that the transferred protective layer can be kept transparent.

The protective layer may be formed by dissolving or dispersing the above resin for a protective layer and optional additives, such as an ultraviolet absorber, an organic filler and/or an inorganic filler, in a suitable solvent to prepare an ink for a protective layer, coating the ink onto the above support by formation means, such as gravure printing, screen printing, or reverse coating using a gravure plate, and drying the coating.

The coverage of the whole layer to be transferred (thermally transferable resin layer) in the thermally transferable image protective sheet used in the present invention is about 0.3 to 10 g/m$^2$, preferably 0.5 to 5 g/m$^2$, on a dry basis.

When the protective layer functions as a peel layer and/or an adhesive layer, the thermally transferable resin layer may be constituted by a single layer alone, i.e., the protective layer alone, or alternatively the layer construction of the thermally transferable resin layer may be properly varied.

Adhesive Layer

In the thermally transferable image protective sheet used in the present invention, an adhesive layer 6 may be provided on the surface of the protective layer or the peel layer (release layer) from the viewpoints of improving the transferability of the thermally transferable resin layer onto the print as an object and, at the same time, improving the adhesion of the thermally transferable resin layer after transfer to the print as the object. The adhesive layer may be formed of any conventional pressure-sensitive adhesive or heat-sensitive adhesive. The adhesive layer is preferably formed of a thermoplastic resin having a glass transition temperature (Tg) of 40 to 80° C. For example, the selection of a resin having a suitable glass transition temperature from resins having good heat adhesion, for example, polyester resins, vinyl chloride-vinyl acetate copolymer resins, acrylic resins, ultraviolet screening resins, butyral resins, epoxy resins, polyamide resins, and vinyl chloride resins, is preferred.

Ultraviolet screening resins, which may be added to the adhesive layer, may be the same as those described above in connection with the protective layer. The adhesive layer may be formed by coating a coating liquid containing the resin for constituting the adhesive layer and optional additives, such as an ultraviolet absorber and an inorganic or organic filler, and drying the coating to form an adhesive layer preferably having a thickness of about 0.5 to 10 g/m$^2$ on a dry basis. When the thickness of the adhesive layer is below the lower limit of the above-defined thickness range, the adhesion between the print and the thermally transferable resin layer is so low that, at the time of printing, a failure of the thermally transferable resin layer to be transferred onto the print is likely to occur. On the other hand, when the thickness of the adhesive layer is above the upper limit of the above-defined thickness range, the sensitivity in transfer at the time of the thermal transfer of the protective layer is lowered and, consequently, the formation of a uniform protective layer by the thermal transfer is difficult.

The above-described layers constituting the thermally transferable resin layer provided separably on the support, such as the protective layer and the adhesive layer, should have transparency on a level high enough not to hinder the viewing of the underlying image after the transfer of the thermally transferable resin layer onto the print.

Print

The print 8 used in the present invention as one which has been output by any nonsilver photographic color hard copy recording method selected from an electrophotographic recording method, an ink jet recording method, and a thermal transfer recording method. In this case, an image may be formed directly on a substrate. Alternatively, if necessary, a receptive layer suitable for the recording method used may be provided on the substrate so that the recording material can be easily received and fixed.

Substrates for the print usable herein include, for example, synthetic papers (such as polyolefin and polystyrene papers), wood-free papers, art papers, coated papers, cast coated papers, wallpapers, backing papers, papers impregnated with synthetic resin or emulsion, papers impregnated with synthetic rubber, latex, papers with synthetic resin being internally added thereto, cellulosic fiber papers, such as paperboards, various plastic films or sheets, such as films or sheets of polyolefin, polystyrene, polycarbonate, polyethylene terephthalate, polyvinyl chloride, and polymethacrylate. Further, additional examples of films or sheets usable herein include, but are not particularly limited to, white opaque films prepared by adding a white pigment or a filler to the synthetic resin and forming a film from the mixture, and films with microvoids in the interior of the substrate. Further, a laminate of any combination of the above substrates may also be used. The thickness of these substrates may be any one, and, for example, is generally about 10 to 300 $\mu$m.

An electrophotographic recording method is one of the recording methods usable in the formation of images in the above prints. The principle of this recording method is as follows. When a photoreceptor passes through an electrifier, ions generated by corona discharge are evenly electrified on the surface of the photoreceptor. The surface of the photoreceptor is imagewise exposed in an exposure section. Electrified charges in areas exposed to light are removed by a photo-conducting phenomenon to form a latent image using charges in non-exposed areas. Next, in a development section, a charged toner is electrostatically deposited onto the latent image to form a visible image which is then transferred onto a print in a transfer section. The transferred image is then fixed onto the print by heat and pressure in a fixation section.

In the formation of a full-color image, toners of four colors, i.e., yellow, magenta, cyan, and black toners, are provided, and the above-described process is repeated for each of the toners.

An ink jet recording method may be used as one of the recording methods for the formation of images on prints. According to this method, ink droplets are ejected and deposited directly onto a recording medium to form characters or images. For example, in an on-demand-type ink jet recording method, droplets of ink are formed in response to image signals to perform recording. The on-demand-type ink jet recording method is classified, for example, into an electromechanical conversion type wherein a piezoelectric element is energized to change the volume of an ink chamber to eject the ink through nozzles, and an electrothermal conversion method wherein a heating element is buried in nozzles and is energized to instantaneously heat and boil the ink and consequently to form bubbles in the ink, which bubbles cause a rapid volume change to eject the ink through the nozzles. In the formation of a full-color image, inks of four colors of yellow, magenta, cyan, and black are provided, and the above-described process is repeated for each ink.

Further, a thermal transfer recording method may be mentioned as one of the recording methods for the formation of images on prints. According to this method in recording, heat energy controlled by image signals is generated by a thermal head and is used as an activating energy for recording materials such as inks. More specifically, an ink ribbon is put on top of recording paper, and the laminate is passed through between a thermal head and a platen under a suitable level of pressure. In this case, the recording material is activated by the thermal head heated by energization and is transferred onto the recording paper with the slid of the pressure of the platen. This transfer recording method may be classified into a thermal ink transfer type and a thermal dye sublimation transfer type, and any of these types may be used in the formation of images on prints according to the present invention.

An image may be formed on recording paper by any one of the above-described nonsilver photographic color hard copy recording methods, i.e., electrophotographic recording, ink jet recording, and thermal transfer recording methods. Alternatively, a combination of a plurality of the above recording methods may be used. For example, a method may be used wherein, in a halftone image portion, recording is carried out by the electrophotographic recording method while, in a character portion, recording is carried out by the thermal ink transfer recording method.

The receptive layer may be formed by adding optional additives to a resin suitable for a recording method used, dissolving or dispersing the mixture in a suitable solvent to prepare a coating liquid, applying the coating liquid onto a substrate by conventional printing means, such as gravure printing or silk screen printing, or conventional coating means, such as gravure coating, to a thickness of about 0.5 to 10 μm on a dry basis.

Method for Protective Layer Formation

The method for protective layer formation according to the present invention includes the steps of: providing the above thermally transferable image protective sheet and the above print; putting the thermally transferable image protective sheet and the print on top of each other so that the thermally transferable resin layer is brought into contact with the image face of the print, and thermally transferring the thermally transferable resin layer onto the image in the print so as to cover at least the printed portion in the print; and then separating the support to form a protective layer on the image in the print. In the method for protective layer formation, the thermally transferable resin layer is thermally transferred as a protective layer, from a thermally transferable image protective sheet comprising a thermally transferable resin layer provided separably on a support, onto an image in a print formed by a nonsilver photographic color hard copy recording method. In this case, means usable for the thermal transfer of the thermally transferable resin layer as the protective layer includes: heating by a thermal head in such a state that a print and a thermally transferable image protective sheet are sandwiched between a thermal head and a platen; a heat roll method as shown in FIG. 3 (which is mainly used in commercially available laminators and uses hot pressing by means of a pair of heat rolls); sandwiching of a print and a thermally transferable image protective sheet between a heated flat plate and a flat plate; and sandwiching of a print and a thermally transferable image protective sheet between a heated flat plate and a roll followed by hot pressing. Further, thermal transfer means using heating by laser irradiation is also applicable.

In the method for protective layer formation according to the present invention, means for forming an image in a print by the nonsilver photographic color hard copy recording method, such as an electrophotographic recording method, an ink jet recording method, or a thermal transfer recording method, and means for the thermal transfer of a protective layer on an image in a print using a thermally transferable image protective sheet comprising a thermally transferable resin layer separably provided on a support are carried out in an in-line or offline manner which may be freely specified. When the above means is carried out in an in-line manner, the image forming means and the protective layer thermal transfer means may be carried out in an identical apparatus, or alternatively, separate apparatuses may be connected to each other and, in this state, may be used for carrying out these means.

The method for protective layer formation according to the present invention is advantageous in that, after the formation of an image in a print by an electrophotographic recording method, a protective layer can be formed on the toner image in the print by using means for the thermal transfer of a protective layer. Therefore, fastness or resistance properties, such as lightfastness, of images of toners of yellow, magenta, cyan and the like can be improved.

Prints yielded by an ink jet recording method, when allowed to stand in the air, are likely to undergo a change in hue under the influence of ozone, oxygen or the like. The protective layer formed by the thermal transfer of the thermally transferable resin layer according to the present invention can function also as a gas barrier and thus can avoid this unfavorable phenomenon and can improve fastness or resistance properties of the images in the prints.

In the present invention, the specular glossiness of the surface of the thermally transferable resin layer in the print after the transfer of the protective layer as measured at an angle of incidence of 20 degrees according to JIS Z 8741 is not less than 60%, and a specular glossiness of 90 to 60% is most preferred from the viewpoint of providing glossy impression comparable to that of silver salt photographs. When the specular glossiness exceeds 90%, the glossy impression is deviated from the glossy impression range of silver salt photographs and is unnatural. On the other hand, when the specular glossiness is below the lower limit of the above-defined range, the glossy impression is inferior to that of silver salt photographs. In this cast, the impression is that the quality of the image is different from that of the image formed by silver photography.

In the present invention, the specular glossiness not less than 60% was specified by measuring the specular glossiness of the surface of the thermally transferred resin layer in the print after the transfer of the thermally transferable resin layer at an angle of incidence of 20 degrees according to JIS Z 8741. When the angle of incidence is larger than 20 degrees, for example, 60 degrees, the specular glossiness value is not very changed and does not reflect a difference in glossy impression in the case of visual observation of the print. The reason why the angle of incidence has been specified to 20 degrees is that the difference in glossy impression in the case of visual observation of the print is very close to the difference in specular glossiness value.

As described above, the surface roughness Ra of the support on its transfer side, that is, on its thermally transferable resin layer side, is not more than 18 nm. The surface roughness Ra is most preferably 15 to 5 nm from the practical point of view. In this case, a print with a protective layer transferred thereon can be provided which, when the image is viewed, has a good glossy impression comparable to silver salt photographs. When the surface roughness exceeds 18 nm, the glossy impression is deteriorated. On the other hand, when the surface roughness is less than 5 nm, the cost is sometimes increased.

When the surface roughness is about 5 nm, that is, when the surface of the support is smooth, in the case of a thermally transferable image protective sheet using a support having a single-layer structure, a problem of blocking or winding loosening occurs at the time of sheet production. When a support having a multilayer structure is adopted for solving this problem, high smoothness of only the surface of the support in contact with the thermally transferable resin layer suffices for good results. In this case, the other surface of the support has a certain level of roughness. This construction can simultaneously solve the problem of glossy impression comparable to that of silver salt photographs and the problem of blocking at the time of sheet production.

EXAMPLES

The following examples further illustrate the present invention. In the following description, "parts" or "%" is by weight unless otherwise specified.

Thermally transferable image protective sheets of the examples of the present invention and the comparative examples were prepared under the following conditions.

Polyethylene terephthalate films shown in Tables 1 and 2 were provided as supports. A coating liquid for a protective layer having the following composition was gravure coated onto the supports at a coverage of 1.0 g/m$^2$ on a dry basis, and the coating was then dried at 110° C. for one min to form a protective layer. Next, a coating liquid for an adhesive layer having the following composition was gravure coated on each protective layer at a coverage of 1.5 g/m$^2$ on a dry basis, and the coating was then dried at 110° C. for one min to form an adhesive layer. Thus, thermally transferable image protective sheets of Examples 1, 2, 5, 6, and 7 and Comparative Example 1 were prepared.

Separately, a coating liquid having the following composition for a release layer was gravure coated on supports shown in Tables 1 and 2 at a coverage of 0.7 g/m$^2$ on a dry basis, and the coating was then dried at 110° C. for one min. A protective layer and an adhesive layer were formed on the release layer in the same manner as described above. Thus, thermally transferable image protective sheets of Example 3 and Comparative Example 2 were prepared.

Further, separately, the coating liquid for a release layer as used just above was gravure coated on a support shown in Tables 1 and 2 at a coverage of 1.5 g/m$^2$ on a dry basis, and the coating was then dried at 110° C. for one min. A protective layer and an adhesive layer were formed on the release layer in the same manner as described above. Thus, a thermally transferable image protective sheet of Example 4 was prepared. The supports used in each of the thermally transferable image protective sheets thus obtained, the provision or non-provision of the release layer and the coverage (on a dry basis) of the release layer, and the results of the measurement of the surface roughness Ra of the thermally transferred resin layer on its support side after the separation of the thermally transferred resin layer from the support are shown in Table 2.

| | |
|---|---|
| Coating liquid for protective layer | |
| BR-87 (acrylic resin, manufactured by Mitsubishi Rayon Co., Ltd.) | 100 parts |
| RV 220 (polyester resin, manufactured by Toyobo Co., Ltd.) | 0.5 part |
| Methyl ethyl ketone | 200 parts |
| Toluene | 1200 parts |
| Coating liquid for adhesive layer | |
| RV 700 (polyester resin, manufactured by Toyobo Co., Ltd.) | 100 parts |
| TINUVIN 900 (a benzotriazole ultraviolet absorber, manufactured by Ciba-Geigy) | 10 parts |
| Methyl ethyl ketone | 200 parts |
| Toluene | 200 parts |

-continued

| | |
|---|---|
| Coating liquid for release layer | |
| Acryl-styrene resin (CELTOP 226, manufactured by Daicel Chemical Industries, Ltd.) | 16 parts |
| Aluminum catalyst (CELTOP CAT-A, manufactured by Daicel Chemical Industries, Ltd.) | 3 parts |
| Methyl ethyl ketone | 8 parts |
| Toluene | 8 parts |

The surface roughness Ra of the above supports on their thermally transferable resin layer side was measured in a measurement area of 20 $\mu$m square with NanoScope IIIa manufactured by Digital Instruments. For Examples 5 to 7, the supports used were of a laminate type, and the roughness Ra of the surface of the support remote from the thermally transferable resin layer was also measured. The results are shown in Tables 1 and 2.

Measurement of Surface Roughness

For the thermally transferable image protective sheets of the examples of the present invention and the comparative examples, the surface roughness Ra of the thermally transferable resin layer on its separation surface side, that is, on its support side, was measured in the same manner as described above with NanoScope IIIa manufactured by Digital Instruments in an measurement area of 20 $\mu$m square.

TABLE 1

| Support | Type | Surface roughness Ra, nm: Smooth surface side* | Surface roughness Ra, nm: Rough surface side* |
|---|---|---|---|
| Lumirror T60#25, manufactured by Toray Industries, Inc. | Single-layer type | 5 | — |
| Lumirror S10#12, manufactured by Toray Industries, Inc. | Single-layer type | 8 | — |
| DIAFOIL K203E4.5, manufactured by MITSUBISHI POLYESTER FILM CORPORATION | Single-layer type | 21 | — |
| Lumirror 4XN36H, manufactured by Toray Industries, Inc. | Multilayer type | 12 | 22 |
| Lumirror 6N32A, manufactured by Toray Industries, Inc. | Multilayer type | 10 | 15 |
| Lumirror 7AN22G, manufactured by Toray Industries, Inc. | Multilayer type | 3 | 11 |

Note 1)
Smooth surface side: the side of support located on thermally transferable resin layer side.
Note 2)
Rough surface side: means the side of support located on a opposite side of thermally transferable resin layer side.

TABLE 2

| | Support | Coverage of release layer, g/m$^2$ | Roughness Ra of smooth surface*, nm |
|---|---|---|---|
| Ex. 1 | Lumirror T60#25 | Not coated | 5 |
| Ex. 2 | Lumirror S10#12 | Not coated | 8 |

TABLE 2-continued

| | Support | Coverage of release layer, g/m$^2$ | Roughness Ra of smooth surface*, nm |
|---|---|---|---|
| Comp. Ex. 1 | DIAFOIL K203E4.5 | Not coated | 21 |
| Ex. 3 | Lumirror S10#12 | 0.7 | 7 |
| Comp. Ex. 2 | DIAFOIL K203E4.5 | 0.7 | 20 |
| Ex. 4 | DIAFOIL K203E4.5 | 1.5 | 18 |
| Ex. 5 | Lumirror 4XN36H | Not coated | 12 |
| Ex. 6 | Lumirror 6N32A | Not coated | 10 |
| Ex. 7 | Lumirror 7AN22G | Not coated | 3 |

Note)
Smooth surface: the surface of support located on thermally transferable resin layer side or the surface of support provided on release layer side-when the release layer has been provided on the support.

For the thermally transferable image protective sheets of the examples of the present invention and the comparative examples, after the preparation of these sheets, the sheets were wound up in a roll form. The rolls were then stored at room temperature for one day. After the storage, the state of the rolls of the sheets was visually inspected. As a result, for the thermally transferable image protective sheets of Examples 5 to 7, winding loosening did not occur at the time of winding-up of the sheets. Further, even after the storage for one days blocking between sheets did not occur, and good state could be maintained.

Transfer of Thermally Transferable Resin Layer from Thermally Transferable Image Protective Sheet onto Image Receiving Sheet Each of the thermally transferable image protective sheet prepared above was provided. Further, a print obtained by printing a full density blotted black image with a reflection density OD=2.0 by a dye sublimation printer UP-D 70 A manufactured by Sony Corp. was also provided. In this print, at this stage, no thermally transferable resin layer was transferred. The thermally transferable image protective sheet was put on top of the print so that the surface of the adhesive layer in the thermally transferable image protective sheet was brought into contact with the image receiving surface side of the print. The assembly was heated with a laminator Lamipacker LPD 3204 manufactured by Fujipla Inc. under conditions of heat temperature 130° C. and speed one m/min.

After the heating of the assembly of the thermally transferable image protective sheet and the image receiving sheet under the above conditions, the support was separated and removed to prepare a print with a protective layer formed thereon. The specular glossiness of the surface of the protective layer in the print with a protective layer formed thereon was measured at an angle of incidence of 20 degrees according to JIS Z 8741.

Specular Glossiness

A full density blotted black image with a reflection density OD=2.0 was printed with a dye sublimation printer UP-D 70 A manufactured by Sony Corp. At this stage, no thermally transferable resin layer was transferred onto the image. Separately, thermally transferable image protective sheets, wherein a thermally transferable resin layer as a thermally transferable protective layer was formed on a support, were provided. In this case, the surface roughness of the interface between the support and the thermally transferable resin layer was varied. The thermally transferable resin layer was put on top of the print so as to cover the image of the print. The assembly was heated with a laminator Lamipacker LPD 3204 manufactured by Fujipla Inc. under conditions of 130° C. and one m/min to transfer the thermally transferable resin layer onto the image. The support was then separated and removed to form a thermally transferred resin layer on the print.

The specular glossiness of the image sample thus prepared was measured with a gloss meter VG 2000, manufactured by Nippon Denshoku Co., Ltd. at an angle of incidence of 20 degrees according to JIS 8741.

Glossy Impression

The sample after the transfer was visually inspected from a distance of 45 cm in a room under fluorescent light to compare the glossy impression of the sample with an identical image formed by silver photography. The results were evaluated according to the following criteria.

○: Good glossy impression, and no unnatural feeling

Δ: Somewhat inferior glossy impression as compared with image formed by silver photography X: Unsatisfactory glossy impression The specular glossiness of the surface of the image after the transfer of the thermally transferable resin layer and the glossy impression by visual inspection are shown in Table 3. In Table 3, the results of measurement of the surface roughness Ra shown in Table 2 are also shown for reference.

TABLE 3

| | Roughness Ra of smooth surface*, nm | Specular glossiness after transfer of protective layer as measured at angle of incidence of 20 degrees | Comparison of glossy impression with that of silver salt photograph |
|---|---|---|---|
| Ex. 1 | 5 | 80 | ○ |
| Ex. 2 | 8 | 77 | ○ |
| Comp. Ex. 1 | 21 | 50 | X |
| Ex. 3 | 7 | 78 | ○ |
| Comp. Ex. 2 | 20 | 55 | X |
| Ex. 4 | 18 | 60 | Δ |
| Ex. 5 | 12 | 72 | ○ |
| Ex. 6 | 10 | 75 | ○ |
| Ex. 7 | 3 | 81 | ○ |

Note 1)
Smooth surface: the surface of support located on thermally transferable resin layer side or the surface of support provided on release layer side when the release layer has been provided on the support.
Note 2)
Angle of incidence: Angle from normal direction
Glossiness: in %

For samples (prints with protective layer transferred thereon) after the measurement of the specular glossiness and images, identical to the images of the samples, formed by silver photography, the specular glossiness was measured at angles of incidence of 20 degrees, 45 degrees, 60 degrees, 75 degrees, and 85 degrees according to JIS Z 8741. The results are shown in Table 4. As is apparent from the results, at the angle of incidence 20 degrees, there was a difference in specular glossiness among the silver salt photograph, the example of the present invention, and the comparative example. This is in agreement with the difference in glossy impression in the visual inspection of the prints. On the other hand, for the specular glossinesses at angles of incidence of 45 degrees to 85 degrees, as the angle of incidence increased, the difference in specular glossiness among the silver salt photograph, the example of the present invention, and the comparative example decreased. The results did not reflect the difference in glossy impression in the visual inspection of the prints.

TABLE 4

Comparison of glossiness with varied angles of incidence

| | Angle of incidence* | | | | | Comparison of glossy impression with that of silver |
|---|---|---|---|---|---|---|
| | 20° | 45° | 60° | 75° | 85° | salt photograph |
| Silver salt photograph | 80 | 90 | 93 | 96 | 96 | — |
| Comp.Ex. 1 | 50 | 72 | 79 | 91 | 96 | X |
| Ex. 4 | 60 | 70 | 79 | 91 | 96 | Δ |

Note)
Angle of incidence: Angle from normal direction
Glossiness: in %

What is claimed is:

1. A thermally transferable image protective sheet, comprising:

a support comprising a biaxially oriented laminated polyester film having a first surface and a second surface; and a thermally transferable resin layer having a single-layer or multilayer structure stacked on the support so as to be separable from the support;

wherein:

when the thermally transferable resin layer is thermally transferred to a print so as to cover at least an image portion of the print and is subsequently separated from the support to form a thermally transferred resin layer on a surface of the print, the thermally transferred resin layer has a specular glossiness of not less than 60% as measured at an angle of incidence of 20 degrees according to JIS (Japanese Industrial Standards) Z 8741;

the first surface of the biaxially oriented laminated polyester film contacts the thermally transferable resin layer and has a first surface roughness Ra of not more than 18 nm; and the second surface of the biaxially oriented laminated polyester film has a second surface roughness Ra larger than the first surface roughness.

2. A thermally transferable image protective sheet, comprising:

a support comprising a biaxially oriented laminated polyester film having a first surface and a second surface opposite from the first surface; and a thermally transferable resin layer having a single-layer or multilayer structure stacked on the support so as to be separable from the support;

wherein:

when the thermally transferable resin layer is thermally transferred to a print so as to cover at least an image portion of the print and is subsequently separated from the support to form a thermally transferred resin layer on a surface of the print, the thermally transferred resin layer has a layer surface roughness Ra of not more than 18 nm;

the biaxially oriented laminated polyester film has a thickness of from 3 to 100 μm;

the first surface of the biaxially oriented laminated polyester film contacts the thermally transferable resin layer and has a first surface roughness Ra of not more than 18 nm; and the second surface of the biaxially oriented laminated polyester film has a second surface roughness Ra larger than the first surface roughness.

3. The thermally transferable image protective sheet according to claim 1, wherein the image portion of the print is formed by a method selected from the group consisting of an electrophotographic recording method, an ink jet recording method, and a thermal transfer recording method.

* * * * *